(12) United States Patent
Feigel

(10) Patent No.: US 6,494,546 B1
(45) Date of Patent: Dec. 17, 2002

(54) DEVICE FOR REGULATING BRAKE PRESSURE

(75) Inventor: Hans-Jörg Feigel, Rosbach (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/647,002

(22) PCT Filed: Apr. 7, 1999

(86) PCT No.: PCT/EP99/02351

§ 371 (c)(1),
(2), (4) Date: Dec. 6, 2000

(87) PCT Pub. No.: WO99/52756

PCT Pub. Date: Oct. 21, 1999

(30) Foreign Application Priority Data

Apr. 9, 1998 (DE) .......................................... 198 16 011
Jun. 12, 1998 (DE) .......................................... 198 26 346

(51) Int. Cl.⁷ .............................. B60T 8/34; B60T 11/00
(52) U.S. Cl. ................................. 303/113.4; 303/114.1; 188/358
(58) Field of Search ............................ 303/113.1, 113.3, 303/113.4, 114.1, 114.2, 116.1, 116.2, 113.2, 115.2; 188/355, 358, 360

(56) References Cited

U.S. PATENT DOCUMENTS 3,870,377 A * 3/1975 Belart et al. .............. 303/114.2
3,976,171 A * 8/1976 Belart ........................ 188/345
5,531,509 A * 7/1996 Kellner et al. ........... 303/114.1
5,791,746 A * 8/1998 Groll et al. .............. 303/113.4
6,007,161 A * 12/1999 Worsdorfer .............. 303/115.2

FOREIGN PATENT DOCUMENTS

| DE | 34 45 566 | 6/1986 |
|---|---|---|
| DE | 44 25 477 | 1/1996 |
| DE | 195 17 708 | 11/1996 |
| DE | 195 38 794 | 4/1997 |
| DE | 196 03 863 | 8/1997 |
| DE | 197 10 862 | 9/1998 |
| GB | 2 292 590 | 2/1996 |
| GB | 2 309 759 | 8/1997 |

* cited by examiner

Primary Examiner—Christopher P. Schwartz
Assistant Examiner—Thomas J. Williams
(74) Attorney, Agent, or Firm—Rader, Fishman & Grauer PLLC

(57) ABSTRACT

The present invention relates to a device for brake pressure control in hydraulic brake systems of vehicles, wherein at least one measuring data emitter for the relative movement between the actuating device and the abutment or for the pedal force introduced into the simulator spring, one measuring data emitter for the position of a brake piston, and one measuring data emitter for the pressure in the brake circuit or between the control valve and the housing, wherein the hydraulic pressure fluid which flows from the pressure supply device by way of the control valve is exclusively fed into a chamber of the housing where it urges the abutment to bear against the stop, on the one hand, and applies pressure to at least one brake piston.

16 Claims, 4 Drawing Sheets

DEVICE FOR REGULATING BRAKE PRESSURE

TECHNICAL FIELD

The present invention generally relates to brake systems and more particularly relates to a device for brake pressure control.

BACKGROUND OF THE INVENTION

A device of this general type is described in DE 35 45 566 A1. It comprises, among other elements, a travel simulator comprised of spring elements, and a pressure supply device with a rubber-diaphragm type pressure reservoir. With rubber diaphragms of this type, gas is gradually diffusing into the brake fluid. Upon failure of the pressure supply device the entire brake system may become unfit for use because the volume of the master brake cylinder is not sufficient to compress the gas contained in the pressure fluid. When the brake system is intact, the gas which entered into the brake circuits cannot be detected by the driver because the pedal feeling remains unchanged due to the employment of the travel simulator.

Thus, an object of the present invention is to improve the reliability in operation of the prior art device, to achieve brake force boosting which is optimal in terms of pedal comfort, and to permit a comfortable brake intervention independent of the driver by way of an electric or electronic control device. Another objective is to permit monitoring the reliability in operation of the brake system by electrically or electronically determining the bleeding condition.

In the device according to the present invention, the entire pressure fluid which is necessary for the braking operation is made available by the pressure supply device by way of application of the brake pistons. The brake pistons are used as a blocking means between the pressure fluid in the actual braking cycle and the possibly gas-containing pressure fluid in the pressure supply device. Extensive tests have shown that a direct application of the brake cylinders out of the pressure supply device is allowable only for short-term ABS brake operations because otherwise the brake effect may be impaired due to insufficient bleeding.

Another advantage of the device of the present invention is that the signals of the measuring data emitters can be used to check the bleeding condition of the brake system. A combined evaluation of the measuring data, compared to stored nominal values or characteristic curves or fields of characteristic curves, permits inferring the condition of the system and triggering an alarm signal, if necessary.

Consequently, the device of the present invention not only permits better preventing the ingress of gas into the actual braking cycle but also achieving an automatic monitoring of the bleeding condition and failure signalling.

DETAILED DESCRIPTION OF THE PREFERRED EMBODIMENTS

Figure 1:
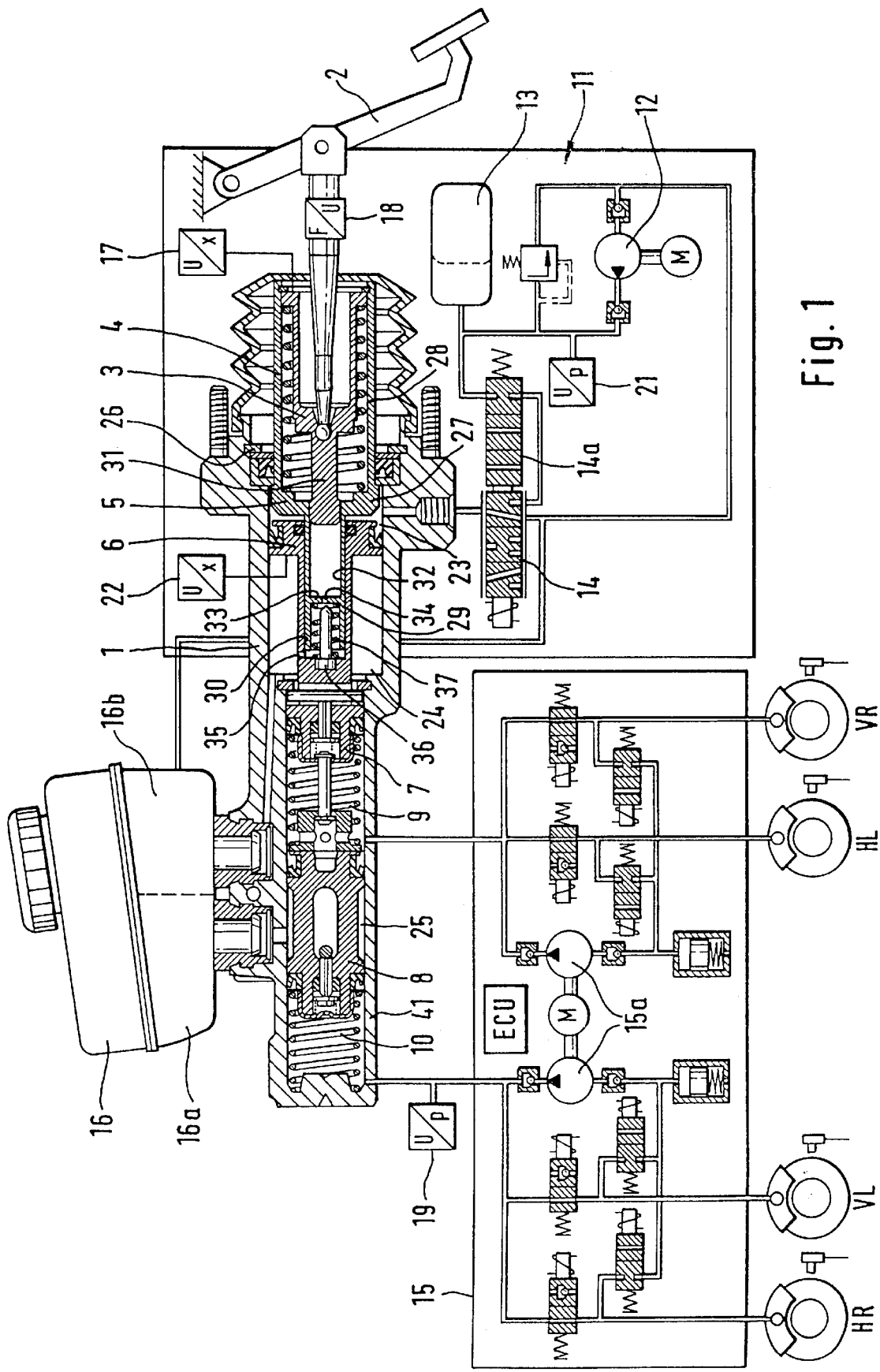
FIG. 1 is a first embodiment of the device with a connecting diagram for the braking cycle and for the pressure supply device.

The device according to FIG. 1 comprises as main assemblies a brake force booster, a tandem master cylinder, a pressure supply device and a valve block for application of the wheel brake cylinders. Housings 1 and 41 for the brake force booster and for the tandem master cylinder have a one-part design, and brake pistons 7 and 8 and an actuating device 3 that is mechanically coupled to a brake pedal 2 are arranged in axial alignment to each other. The actuating device 3 acts by way of a simulator spring 4 on an abutment 5 which, in turn, can directly displace the brake cylinders 7 and 8, arranged in tandem, by way of a piston 6 in case the pressure supply fails.

In the reverse direction, resetting springs 9 and 10 of the brake pistons 7 and 8 act by way of piston 6 on the abutment 5 which, in the initial position, is urged to bear against a stop 26 provided in the housing 1. The component referred to as abutment 5 is composed of a base part 27, a hollow-cylindrical part 28 and a piston-type part 29 which, in turn, extends into a hollow-cylindrical part 30 of piston 6 and has a hollow-cylindrical part 32 which is subdivided by a wall 33.

A piston-shaped extension 31 of the actuating device 3 extends into the portion of the hollow-cylindrical part 32 close to the brake pedal, while a throttle device is designed in the portion of the hollow-cylindrical part 32 close to the brake piston and includes a throttle bore 34 in the wall 33, a throttle bore 35 in the hollow-cylindrical part 30 of the piston 6 and a closure member 36 for the throttle bore 34 biased by a spring 37. The purpose of the throttle device is to improve the response behavior of the brake force booster.

The pressure supply device 11 comprises a motor-driven pump 12, a pressure reservoir 13, and a control valve 14 preceded by a two-way/two-position directional control valve 14a. Device 11 is connected to a chamber 23 designed in the housing 1 between abutment 5 and piston 6.

A supply reservoir for the pressure fluid which is subdivided into two chambers 16a and 16b is arranged above the master brake cylinder 41. The left-hand chamber 16a is connected to a chamber 25 provided between the brake piston 8 and the master brake cylinder 41, while the right-hand chamber 16b is connected by way of a supply bore to a chamber 24 provided between the housing 1 and the piston 6.

The valve block 15 corresponds to a valve block in a conventional brake system. It comprises a motor-driven pump 15a to implement ABS, TCS and other functions.

Further, the embodiment of the idea of the present invention illustrated in FIG. 1 still comprises a measuring data emitter 17 to generate a travel signal for the actuating device 3, a measuring data emitter 18 to generate a travel signal for the brake pedal 2, a measuring data emitter 22 to generate a travel signal for the piston 6, a measuring data emitter 21 to generate a pressure signal for the pressure supply device 11, and a measuring data emitter 19 to generate a pressure signal for the valve block 15.

Figure 2:
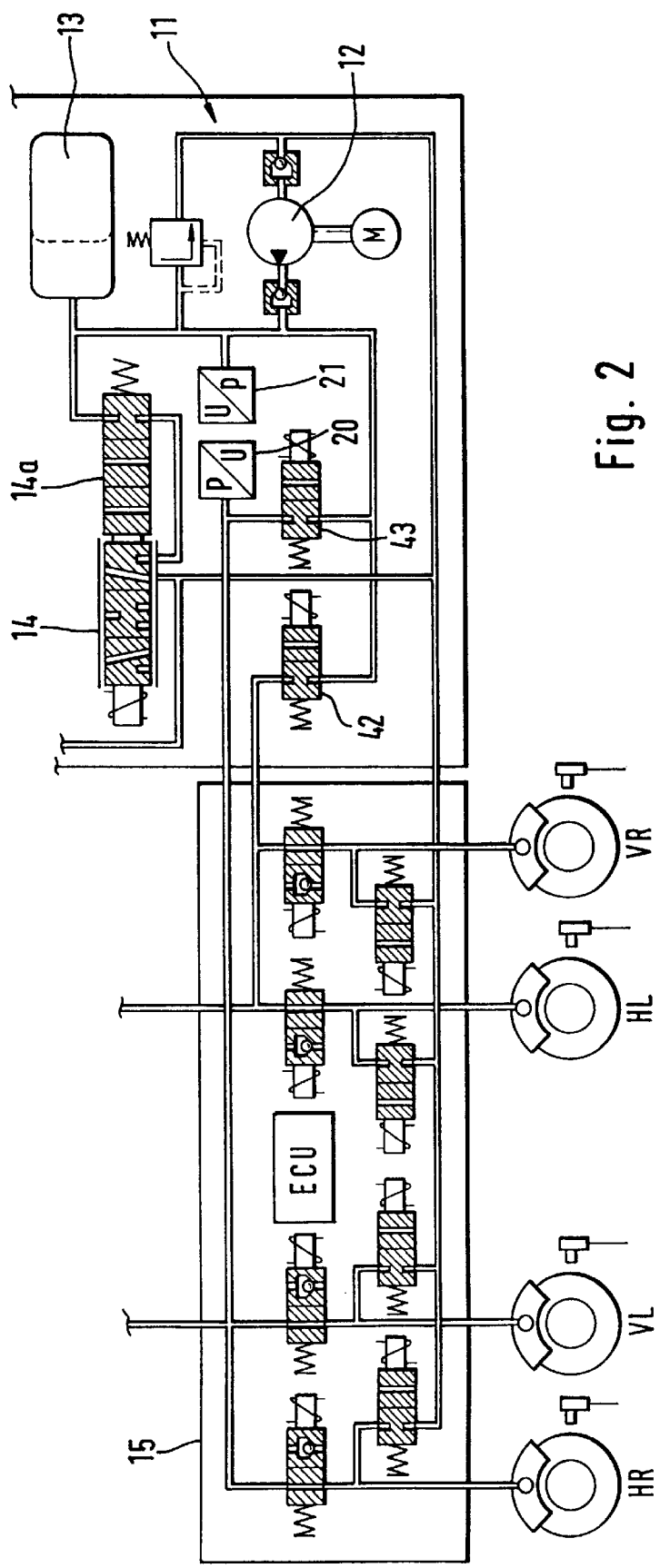
FIG. 2 is a variation of the connecting diagram of FIG. 1.

In the embodiment of FIG. 2, only the pressure supply device 11 and the valve block 15 have been modified compared to FIG. 1. Pump 15a has been omitted in valve block 15. Instead, the application with pressure fluid is performed out of the pressure supply device 11 by way of valves 42 and 43. The measuring data emitter 20 corresponds to the measuring data emitter 19 of FIG. 1 and generates a signal which corresponds to the pressure in the valve block 15.

Figure 3:
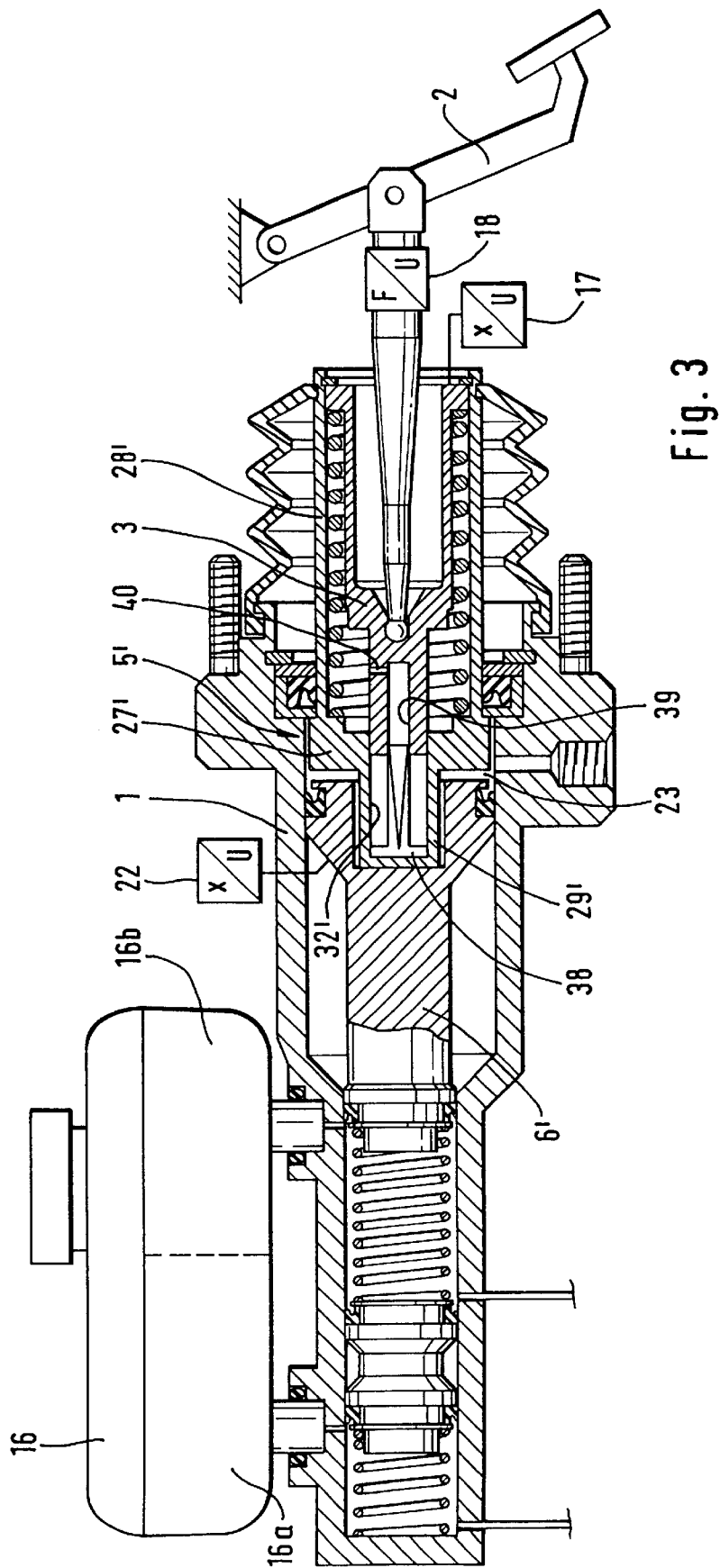
FIG. 3 is a second embodiment of the device of the present invention.

The embodiment according to FIG. 3 is described only insofar as it differs from FIG. 1. The abutment 5' comprises a base part 27', a hollow-cylindrical part 28', and a piston-type part 29' which, in turn, has a hollow-cylindrical part 32'. The throttle device comprises a throttle member 38 with a piston-shaped attachment, a bore 39, and a throttle bore 40 in the part of the actuating device 3 close to the brake piston. Piston 6' and brake pistons 7' and 8' are also modified in their construction compared to the embodiment of FIG. 1. The brake pistons 7' and 8' are biased into their initial position by resetting springs 9' and 10'.

Figure 4:
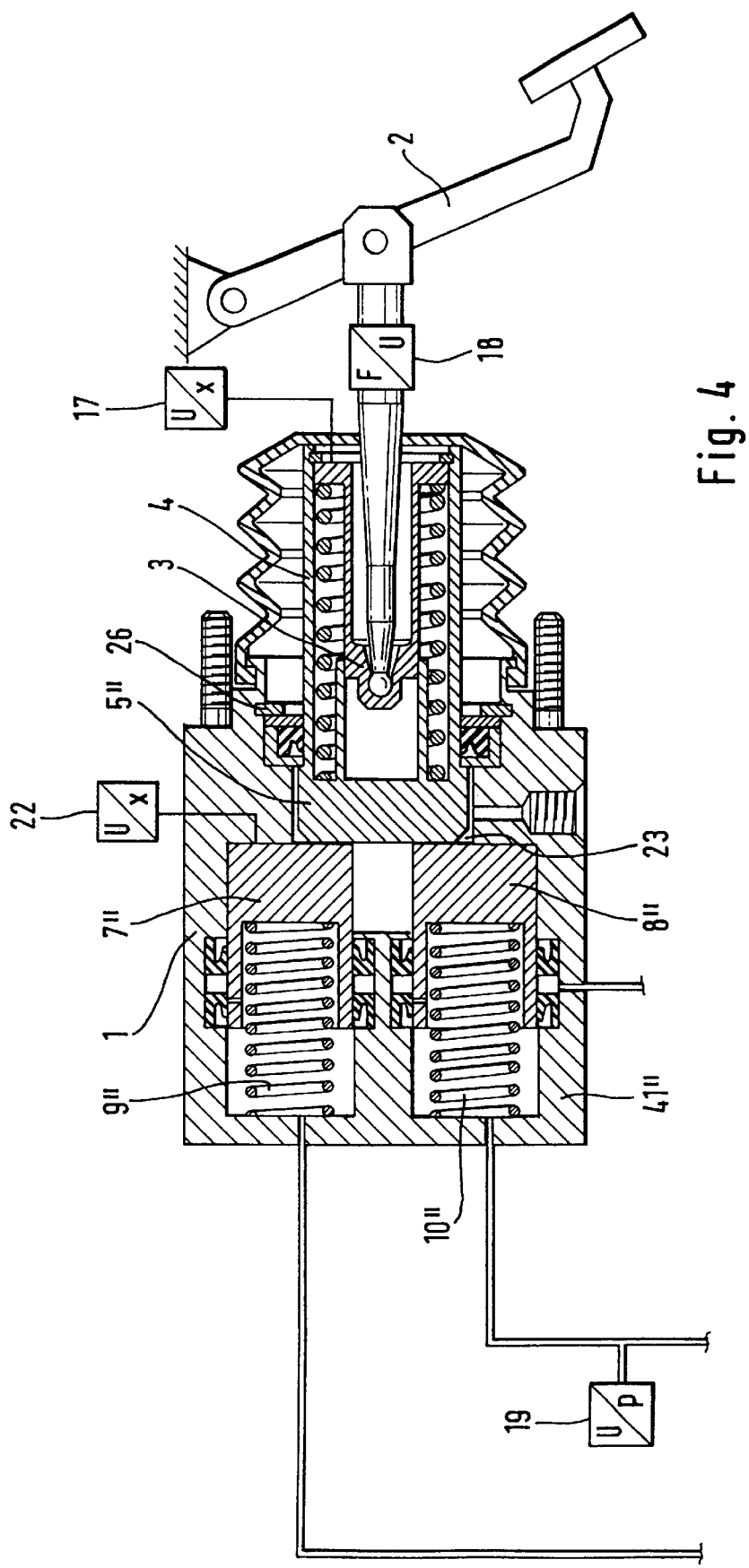
FIG. 4 is a third embodiment of the device of the present invention.

FIG. 4 shows a modified type of construction 5" of the abutment which is appropriate for use with brake pistons 7" and 8" arranged side by side in a master brake cylinder 41". The brake pistons 7" and 8" are biased into their initial position by resetting springs 9" and 10".

What is claimed is:

1. Device for brake pressure control in hydraulic brake systems of vehicles, comprising:
   a housing accommodating an axially displaceable abutment for a simulator spring of an actuating device that is mechanically coupled to a brake pedal, the said abutment in its initial position bearing against a stop provided in the housing,
   a master brake cylinder that has at least one brake piston,
   a pressure supply device with a motor-driven pump, pressure reservoir and control valve,
   an unpressurized supply reservoir for the hydraulic pressure fluid including all necessary connecting lines, and
   an electric or electronic control device, wherein the simulator spring is arranged between the abutment and the actuating device,
   at least one measuring data emitter for the relative movement between the actuating device and the abutment or for the pedal force introduced into the simulator spring,
   one measuring data emitter for the position of a brake piston, and
   one measuring data emitter for the pressure in the brake circuit or between the control valve and the housing, wherein the hydraulic pressure fluid which flows from the pressure supply device via the control valve is exclusively fed into a chamber of the housing where it urges the abutment against the stop, and applies pressure to at least one brake piston.

2. Device as claimed in claim 1, further including a measuring data emitter for the operating pressure of the pressure supply device.

3. Device as claimed in claim 1, wherein the hydraulic pressure fluid is introduced in response to the travel signal of the measuring data emitter.

4. Device as claimed in claim 1, further including a valve block with a motor-driven pump to implement ABS, TCS or other functions.

5. Device as claimed in claim 1, wherein the control valve is actuated by analog operation, wherein the control valve is preceded by a two-way/two-position directional control valve.

6. Device as claimed in claim 1, further including a piston is arranged in the housing between the abutment and the brake piston, wherein a supply chamber is designed between the piston and the brake piston and is connected to the unpressurized supply reservoir.

7. Device as claimed in claim 6, wherein the brake piston is a tandem piston.

8. Device as claimed in claim 1, wherein the chamber of the housing is defined axially by the abutment and directly by at least one axially displaceable brake piston, the brake piston being adapted to be acted upon directly by the abutment in the event of failure of the pressure supply device.

9. Device as claimed in claim 8, wherein two brake pistons are arranged in parallel side by side.

10. Device as claimed in claim 1, wherein the abutment, with the brake pedal not applied, is urged to bear against the stop on the housing by at least one resetting spring of the brake piston(s).

11. Device as claimed in 6, wherein the abutment includes a base part, guided in the housing, from which extends a hollow-cylindrical part for the accommodation of the actuating device and a resetting spring on the one side and a piston-type part on the other side, the latter part being axially displaceably guided in a hollow-cylindrical part of the piston.

12. Device as claimed in claim 11, wherein the piston-type part of the abutment has a hollow-cylindrical configuration, and in that a piston-shaped extension of the actuating device is axially displaceably guided in this hollow-cylindrical part.

13. Device as claimed in claim 12, wherein the hollow-cylindrical part of the piston-shaped part of the abutment is subdivided by a wall with a throttle bore.

14. Device as claimed in claim 13, wherein the hollow-cylindrical part of the piston includes a throttle bore.

15. Device as claimed in claim 14, wherein the hollow-cylindrical part of the piston-shaped part of the abutment accommodates a spring-loaded closure member for the throttle bore in the wall which is maintained in its open position by a spring compressed in the piston between the wall and the end of the hollow-cylindrical part as long as there is no relative movement between the abutment and the stepped piston.

16. Device as claimed in claim 6, wherein the hollow-cylindrical part of the piston-type part of the abutment accommodates a throttle member which extends into a bore in the piston-shaped extension of the actuating device, the said bore including a throttle bore through which pressure fluid can discharge when the actuating device is displaced axially in relation to the abutment.

\* \* \* \* \*